(12) United States Patent
Haiut et al.

(10) Patent No.: US 9,544,788 B2
(45) Date of Patent: Jan. 10, 2017

(54) METHOD AND SYSTEM FOR MOTION DETECTION USING DIGITAL ENHANCED CORDLESS TELECOMMUNICAITON (DECT) SIGNALS

(71) Applicants: Moshe Haiut, Ramat-Gan (IL); Lior Blanka, Rosh Haayin (IL)

(72) Inventors: Moshe Haiut, Ramat-Gan (IL); Lior Blanka, Rosh Haayin (IL)

(73) Assignee: DSP Group Ltd., Herzliya (IL)

( * ) Notice: Subject to any disclaimer, the term of this patent is extended or adjusted under 35 U.S.C. 154(b) by 388 days.

(21) Appl. No.: 14/060,677

(22) Filed: Oct. 23, 2013

(65) Prior Publication Data

US 2014/0140231 A1 May 22, 2014

Related U.S. Application Data

(60) Provisional application No. 61/727,117, filed on Nov. 16, 2012.

(51) Int. Cl.
*H04W 24/08* (2009.01)
*G01S 13/00* (2006.01)
*G08B 13/187* (2006.01)
*G08B 13/24* (2006.01)
*G01S 13/56* (2006.01)
*G01S 7/00* (2006.01)
*G01S 13/46* (2006.01)

(52) U.S. Cl.
CPC ............ *H04W 24/08* (2013.01); *G01S 13/003* (2013.01); *G01S 13/56* (2013.01); *G08B 13/187* (2013.01); *G08B 13/2491* (2013.01); *G01S 7/003* (2013.01); *G01S 2013/462* (2013.01); *H04M 2250/08* (2013.01)

(58) Field of Classification Search
CPC .. G01S 13/003; G01S 7/003; G01S 2013/462; G08B 13/187; G08B 13/2491; H04W 24/08; H04M 2250/08
USPC .......................................................... 370/252
See application file for complete search history.

(56) References Cited

U.S. PATENT DOCUMENTS

| | | | |
|---|---|---|---|
| 2005/0055568 A1* | 3/2005 | Agrawala | G07C 9/00111 726/2 |
| 2005/0078033 A1* | 4/2005 | Tamaki | G01S 5/0252 342/463 |
| 2009/0128412 A1* | 5/2009 | Ryu | G01S 5/0236 342/463 |
| 2009/0160660 A1* | 6/2009 | Nurmela | G08B 21/0415 340/573.4 |

* cited by examiner

*Primary Examiner* — Kan Yuen
*Assistant Examiner* — Richard Chang
(74) *Attorney, Agent, or Firm* — Reches Patents

(57) ABSTRACT

A digital enhanced cordless telecommunication (DECT) base station, the DECT base station may include a transmitter that is arranged to transmit, at different points of time, downlink transmitted DECT signals to another DECT device that differs from the DECT base station; a receiver that is arranged to receive from the other DECT device downlink reception information indicative of attributes of downlink received DECT signals that were received by the other DECT device as a result of the transmission of the downlink transmitted DECT signals; a processor that is arranged to process the downlink reception information to detect a motion that affects a reception of the downlink received DECT signals by the other device.

14 Claims, 9 Drawing Sheets

METHOD AND SYSTEM FOR MOTION DETECTION USING DIGITAL ENHANCED CORDLESS TELECOMMUNICAITON (DECT) SIGNALS

RELATED APPLICATIONS

This patent claims priority from U.S. patent application Ser. No. 61/727,117 filing date Nov. 16, 2012 which is incorporated herein in its entirety by reference.

BACKGROUND OF THE INVENTION

Much research was done on motion sensing that is based on blocking and reflection of radio waves. An object that is located somewhere along the propagation path of a radio signal may affect the overall propagation path of the signal, as it may attenuate, block, or reflect certain parts of the signal. In a multipath environment, a receiver that is tuned to receive the said radio signal receives the superposition of all signal paths—resulting in possible decay or intensification of the signal amplitude depending on the phase of each individual component. Those specific signal components that are affected by a given object may change their phases and amplitudes depending on the position of the object. By inspecting the changes in the received signal amplitude the receiver may be able to determine whether or not there is any object in motion in the close environment. Motion sensing that is based on radio signals consist of a radio transmitter that transmits a constant pattern, a radio receiver, and a processing unit.

SUMMARY OF THE INVENTION

According to various embodiments of the invention there may be provided a devices, methods, and mixers as claimed in the claims and/or illustrated in the specification.

There may be provided, according to an embodiment of the invention, a digital enhanced cordless telecommunication (DECT) base station, the DECT base station may include a transmitter that may be arranged to transmit, at different points of time, downlink transmitted DECT signals to another DECT device that differs from the DECT base station; a receiver that may be arranged to receive from the other DECT device downlink reception information indicative of attributes of downlink received DECT signals that were received by the other DECT device as a result of the transmission of the downlink transmitted DECT signals; a processor that may be arranged to process the downlink reception information to detect a motion that affects a reception of the downlink received DECT signals by the other device.

The transmitter may be further arranged to transmit a DECT base station response indicative of the detection of the motion.

The downlink transmitted DECT signals may be DECT beacons and wherein the downlink received DECT signals may be received DECT beacons.

The attributes of the received DECT beacons relate to intensities of the received DECT beacons; and wherein the processor may be arranged to detect the motion by finding that the downlink reception information may be indicative of changes of intensities between different received DECT beacons that differ from expected changes of intensities at an absence of motion that affects the reception of the downlink received DECT signals by the other device.

The downlink reception information may be indicative of received signal strength indication (RSSI) measurement performed by the other DECT device.

The other DECT device may be a DECT handset.

The other DECT device may be a stationary DECT device that may be without a display and a keyboard.

The transmitter may be arranged to transmit, at the different points of time, downlink transmitted DECT signals to multiple other DECT devices that differs from the DECT base station; wherein the receiver may be arranged to receive from each other DECT device of the multiple other DECT devices downlink reception information indicative of attributes of downlink received DECT signals that were received by the other DECT device as a result of the transmission of the downlink transmitted DECT signals; and wherein the processor that may be arranged to process the downlink reception information received from each one of the multiple DECT devices to detect a motion that affects a reception of any received DECT signals by any of the multiple DECT devices.

The processor may be arranged to detect a motion only if downlink reception information received from a majority of the multiple other DECT devices may be indicative of the motion.

The processor may be arranged to detect a motion only if downlink reception information received from all of the multiple other DECT devices may be indicative of the motion.

The processor may be arranged to detect a motion if downlink reception information received from at least a minority of the multiple other DECT devices may be indicative of the motion.

The receiver may be arranged to receive a motion indication from at least one other DECT device and wherein the processor may be arranged to detect the motion in response to the motion indication.

The receiver may be arranged to measure attributes of downlink received DECT signals that were received as a result of a transmission, from the other DECT device, of uplink transmitted DECT signals; wherein the transmitter may be arranged to transmit to the other DECT device uplink reception information indicative of attributes of uplink received DECT signals.

The receiver may be arranged to receive another motion indication from the other DECT device and wherein the processor may be arranged to detect the motion in response to the other motion indication.

The transmitter may be arranged to transmit the DECT base station response utilizing communication channels that differ from a DECT communication channel established between the DECT base station and the other DECT device.

There may be provided, according to an embodiment of the invention, a method for DECT based motion detection, the method may include transmitting, by a transmitter of a DECT base station, at different points of time, downlink transmitted DECT signals to another DECT device that differs from the DECT base station; receiving, by a receiver of the DECT base station, from the other DECT device downlink reception information indicative of attributes of downlink received DECT signals that were received by the other DECT device as a result of the transmission of the downlink transmitted DECT signals; processing, by a processor of the DECT base station, the downlink reception information to detect a motion that affects a reception of the downlink received DECT signals by the other device.

The method may include displaying an alert on a display, and additionally or alternatively transmitting, by the transmitter, a DECT base station response indicative of the detection of the motion.

The downlink transmitted DECT signals may be DECT beacons and wherein the downlink received DECT signals may be received DECT beacons.

The attributes of the received DECT beacons relate to intensities of the received DECT beacons; and wherein the method may include detecting the motion by finding that the downlink reception information may be indicative of changes of intensities between different received DECT beacons that differ from expected changes of intensities at an absence of motion that affects the reception of the downlink received DECT signals by the other device.

The downlink reception information may be indicative of received signal strength indication (RSSI) measurement performed by the other DECT device.

The other DECT device may be a DECT handset.

The other DECT device may be a stationary DECT device that may be without a display and a keyboard.

The method may include transmitting, at the different points of time, downlink transmitted DECT signals to multiple other DECT devices that differs from the DECT base station; receiving from each other DECT device of the multiple other DECT devices downlink reception information indicative of attributes of downlink received DECT signals that were received by the other DECT device as a result of the transmission of the downlink transmitted DECT signals; and processing the downlink reception information received from each one of the multiple DECT devices to detecting a motion that affects a reception of any received DECT signals by any of the multiple DECT devices.

The method may include detecting a motion only if downlink reception information received from a majority of the multiple other DECT devices may be indicative of the motion.

The method may include detecting a motion only if downlink reception information received from all of the multiple other DECT devices may be indicative of the motion.

The method may include detecting a motion if downlink reception information received from at least a minority of the multiple other DECT devices may be indicative of the motion.

The method may include receiving a motion indication from at least one other DECT device and detecting the motion in response to the motion indication.

The method may include measuring attributes of downlink received DECT signals that were received as a result of a transmission, from the other DECT device, of uplink transmitted DECT signals; and transmitting to the other DECT device uplink reception information indicative of attributes of uplink received DECT signals.

The method may include receiving an uplink motion indication from the other DECT device and detecting the motion in response to the uplink motion indication.

The method may include transmitting the DECT base station response utilizing communication channels that differ from a DECT communication channel established between the DECT base station and the other DECT device.

There may be provided, according to an embodiment of the invention, a digital enhanced cordless telecommunication (DECT) device, the DECT device may include a receiver that may be arranged to receive received DECT signals at different points of time and to measure attributes of the received DECT signals; wherein the received DECT signals result from a transmission of transmitted DECT signals by another DECT device; a processor that may be arranged to process the received attributes to detect a motion within an area located between the DECT device and the other DECT device; and a transmitter that may be arranged to transmit a DECT device response indicative of the detection of the motion.

The DECT device may be DECT handset and the other DECT device may be DECT base station.

The transmitted DECT signals may be multiple transmitted DECT beacons.

The intensities of the multiple transmitted DECT beacons may be maintained constant during the multiple points in time; wherein the attributes of the received DECT signals relate to intensities of the received DECT signals; and wherein the processor may be arranged to detect the motion by finding changes of intensities between different received DECT signals that exceed a threshold.

The transmitter may be further arranged to transmit to the other device multiple additional DECT signals during additional point in time to allow the other DECT device to detect motion.

The DECT device response may include a motion indication and information about values of at least some of the attributes.

The transmission of the DECT device response may include utilizing communication channels that differ from a DECT communication channel established between the DECT device and the other DECT device.

There may be provided, according to an embodiment of the invention, a method for digital enhanced cordless telecommunication (DECT) based motion detection, the method may include receiving, by a receiver of a DECT device, received DECT signals at different points of time and to measure attributes of the received DECT signals; wherein the received DECT signals result from a transmission of transmitted DECT signals by another DECT device; processing, by a processor of the DECT device, the received attributes to detect a motion within an area located between the DECT device and the other DECT device; and transmitting, by a transmitter of the DECT device, a DECT device response indicative of the detection of the motion.

The DECT device may be a DECT handset and the other DECT device may be DECT base station.

The transmitted DECT signals may be multiple transmitted DECT beacons.

The intensities of the multiple transmitted DECT beacons may be maintained constant during the multiple points in time; wherein the attributes of the received DECT signals relate to intensities of the received DECT signals; and wherein the processing may include detecting the motion by finding changes of intensities between different received DECT signals that exceed a threshold.

The method may include transmitting to the other device multiple additional DECT signals during additional point in time to allow the other DECT device to detect motion.

The DECT device response may include a motion indication and information about values of at least some of the attributes.

The transmission of the DECT device response may include utilizing communication channels that differ from a DECT communication channel established between the DECT device and the other DECT device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

Figure 1:
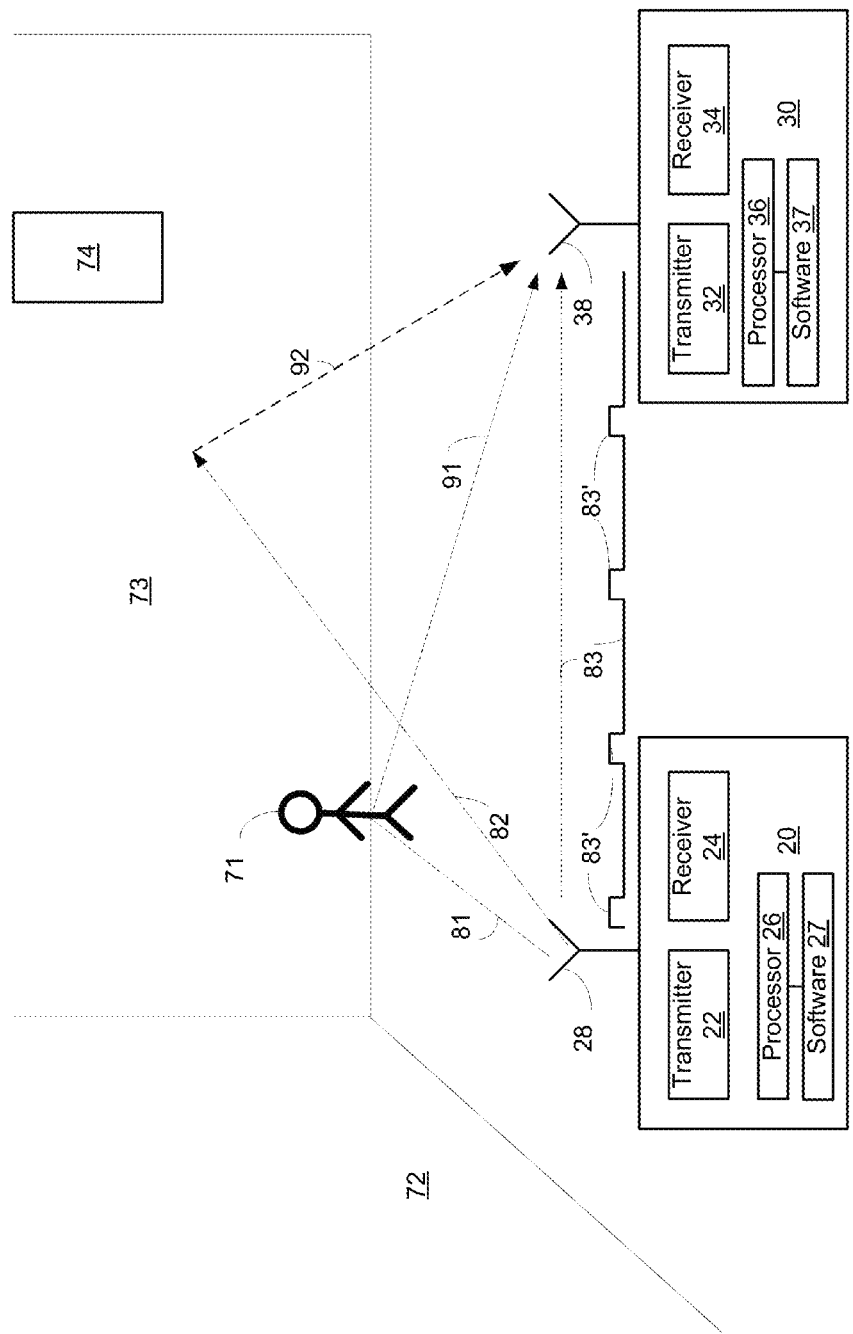
FIG. 1 illustrates DECT devices and their environment according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may, for the most part, be implemented using electronic components and modules known to those skilled in the art, details will not be explained in any greater extent than that considered necessary as illustrated above, for the understanding and appreciation of the underlying concepts of the present invention and in order not to obfuscate or distract from the teachings of the present invention.

There is provided an inherent "motion detection" capability to DECT telephone equipment without adding any extra hardware component. The cost for this home security feature is software only, while it still may provide the user with a real-time alert on a possible thief invasion to his/her house.

This method and device takes advantage of the fact that a DECT network is normally located in a close environment (e.g. home or office), contains a live transmitter which is the DECT base station, and contains a live receiver which is the DECT handset unit. Once every 10 ms the standard base station produces a multicast beacon radio transmission that can be received by the handset unit.

The handset unit contains a signal processing unit that can inspect the amplitude of the received beacon signal and determine if there is any suspicion to a moving object within the close environment. Upon such a suspicion the handset unit immediately reports its findings to the base station, which initiates a phone call or sends an appropriate message to the house owner (e.g. SMS message to the owner's cellular mobile).

Figure 2:
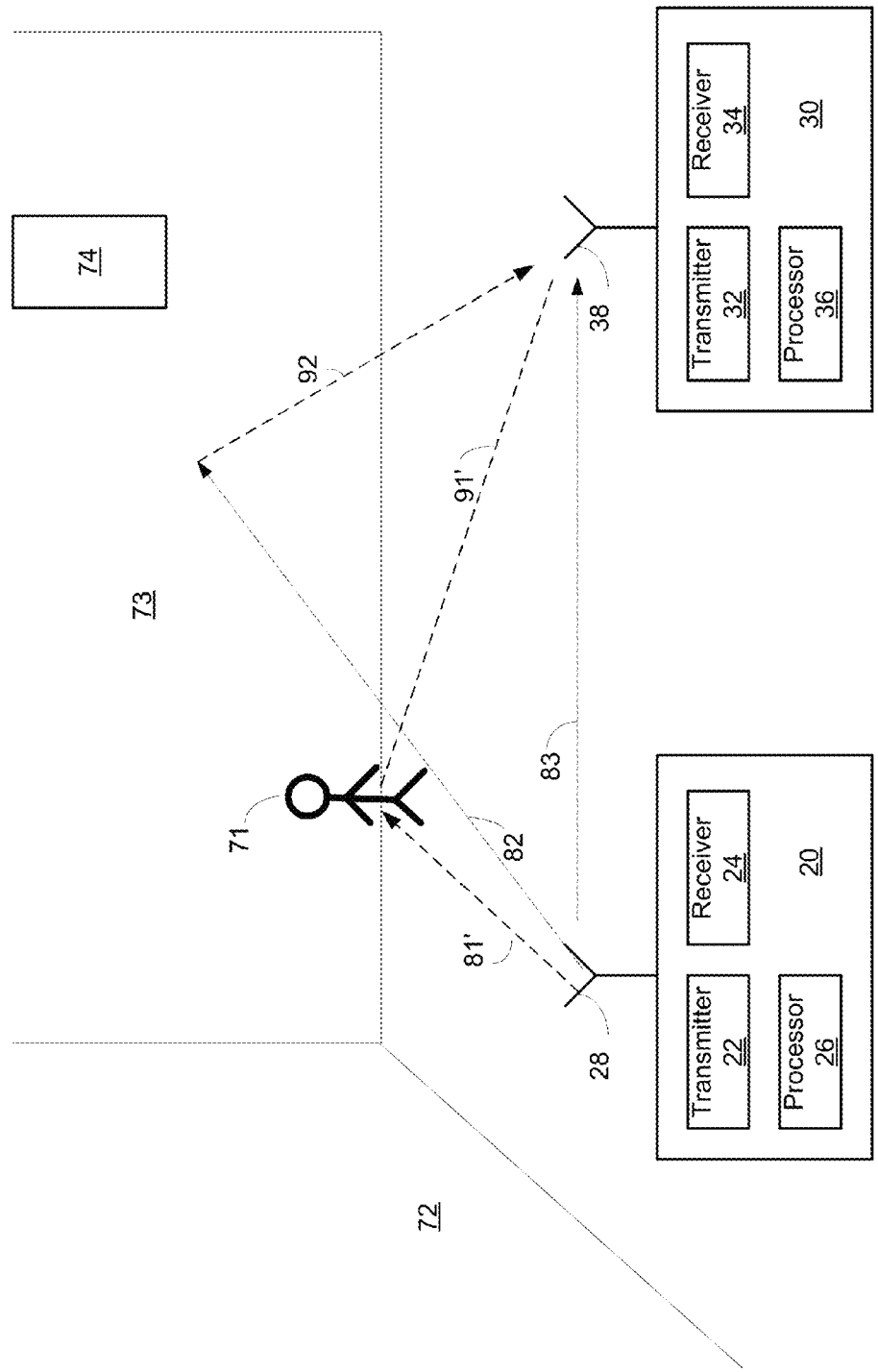
FIG. 2 illustrates DECT devices and their environment according to an embodiment of the invention.
Figure 3:
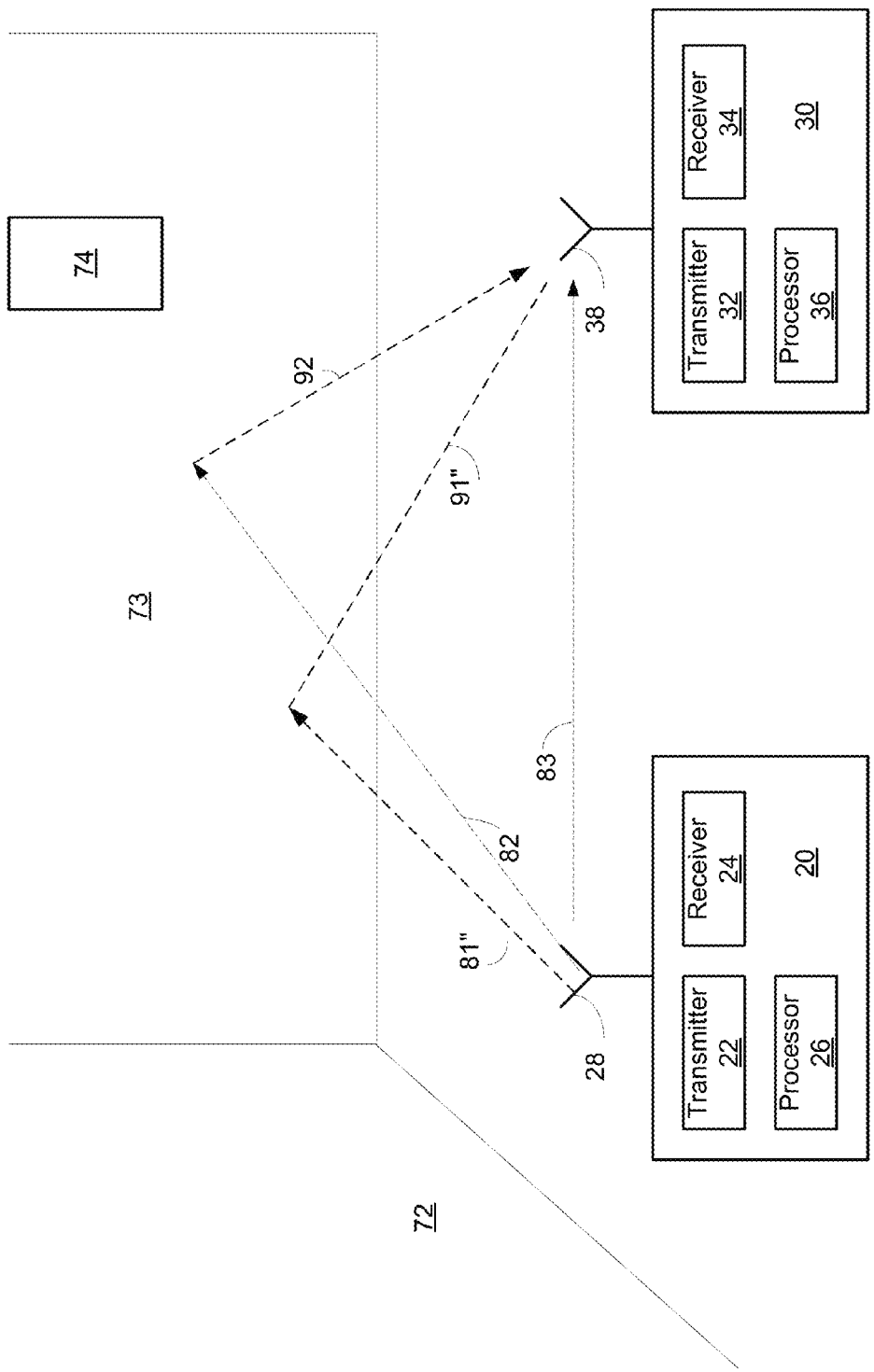
FIG. 3 illustrates DECT devices and their environment according to an embodiment of the invention.

FIGS. 1-3 illustrates DECT devices 20, 30, and their environment according to an embodiment of the invention. The environment includes walls 72 and 72 and a window 74 formed in the room. It is noted that the different DECT devices can be located at different rooms.

DECT device 20 transmits transmitted DECT signals. Referring to FIG. 1—arrows 81, 82 and 83 illustrate various direction of propagation of the transmitted DECT signals—and can be regarded as different components of the DECT transmitted signals. FIG. 1 also illustrates the transmitted DECT signal 83 as including beacons 83' that are spaced apart from each other (for example can be 10 milliseconds from each other).

A signal transmitted from a DECT device is referred to as a transmitted DECT signal. A signal received by a DECT device is referred to as a received DECT signal. A signal that is directly received from a DECT device may be referred to as a received DECT signal or a transmitted DECT signal.

DECT device 30 receives, due to the transmission of the transmitted DECT signals, received DECT signals 92, 91 and 83. Transmitted DECT signal (also referred to as received DECT signal) 83 is directly received from DECT device 20, received DECT signal 92 is received as a result of a reflection of transmitted DECT signal 82 from wall 73 and received DECT signal 91 is received as a result of a reflection of transmitted DECT signal 81 from person 71.

DECT device 20 is shown as including transmitter 22, receiver 24, processor 26 and antenna 28. DECT device 30 is shown as including transmitter 32, receiver 34, processor 36 and antenna 38. Processor 26 can execute software 26 and processor 36 can execute software 37. In other figures the software was not illustrated as a separate box but is inherently included in each DECT device. The software when executed by the processors of the DECT device cause the processor to execute (or at least participate in an execution) of any method illustrated in the specification. Especially the software causes the processor to participate in the motion detection scheme.

In FIG. 2 the person (due to its movement) is located at a different location and DECT device 30 receives DECT signal 91' instead of received DECT signal 91. DECT signal 91' is received as a result of a reflection of transmitted DECT signal 81' from person 71. DECT signal 91 differs from DECT signal 91'.

In FIG. 3 there is no person 71 in the room and DECT device 30 receives DECT signal 91" instead of received DECT signal 91 or received DECT signal 91'. DECT signal 91" is received as a result of a reflection of transmitted DECT signal 81" from wall 73. DECT signal 91" differs from DECT signal 91' and from DECT signal 91.

The DECT device 30 receives a superposition of the different received DECT signals at each point of time and is expected to measure the attributes (for example RSSI) of the received DECT signals. The movement of person 71 is expected to result in detectable differences between the received DECT signals that are received at different points of time.

Figure 4:
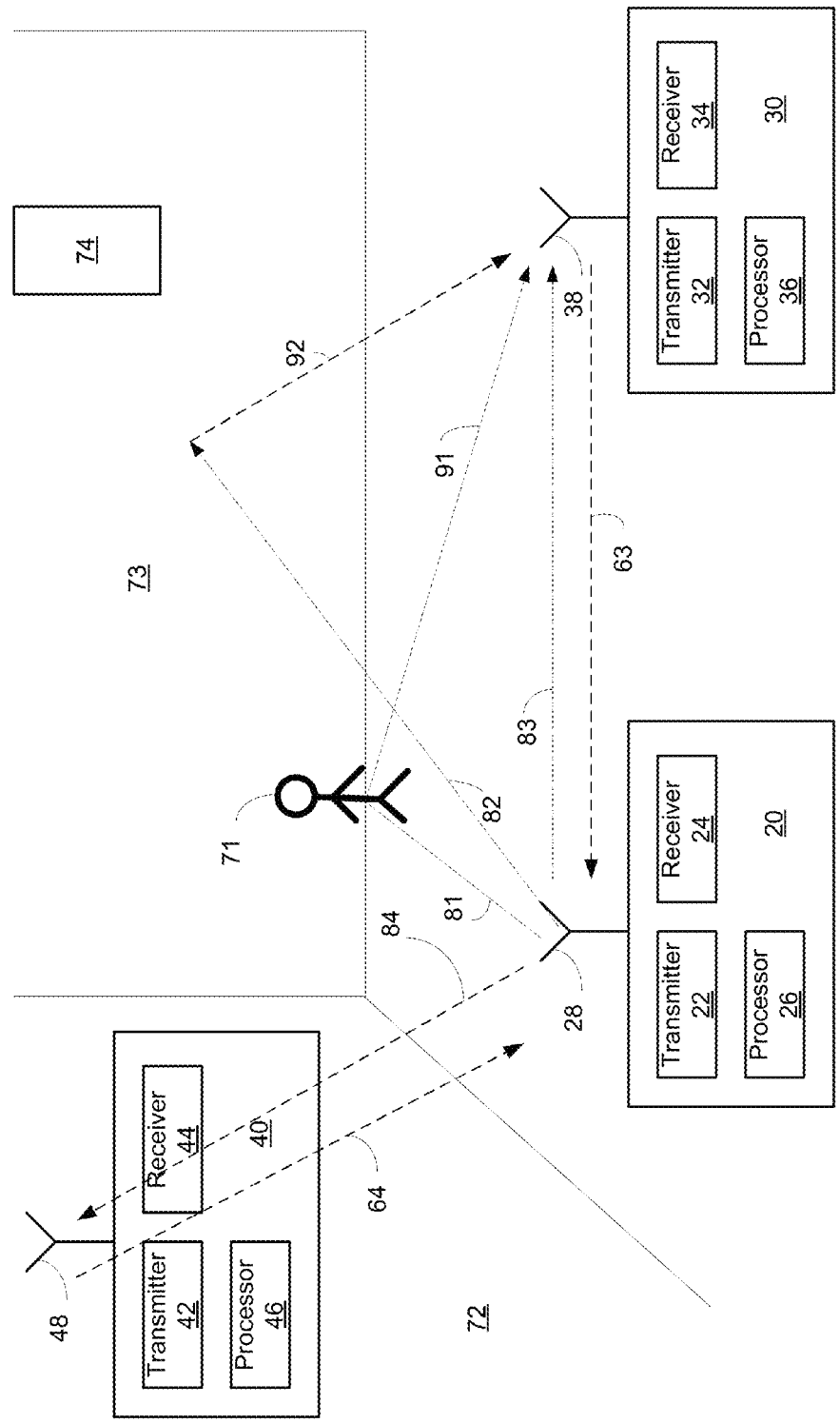
FIG. 4 illustrates DECT devices and their environment according to an embodiment of the invention.

FIG. 4 illustrates the first and second DECT devices 20 and 30 as well as an additional DECT device 40 and a person 71 that is located within the room. While FIGS. 1-3 illustrate transmission of transmitted DECT signals (81, 82 and 83) from DECT device 20 to DECT device 30, FIG. 4 also illustrates transmissions 63 and 64 from DECT devices 30 and 40 towards DECT device 20. These transmissions (63 and 64) can include information, can include transmitted DECT signals that should be received and their attributes calculated by DECT device 30 and the like.

Each reflecting object (such a person 71) affects the amplitude of the received DECT signals—its contribution can increase or decrease this amplitude depending on phase and reflection factor. By inspecting the changes in the amplitude of received DECT signals, processor 36 can detect the motion of person 71 inside a house.

Figure 5:
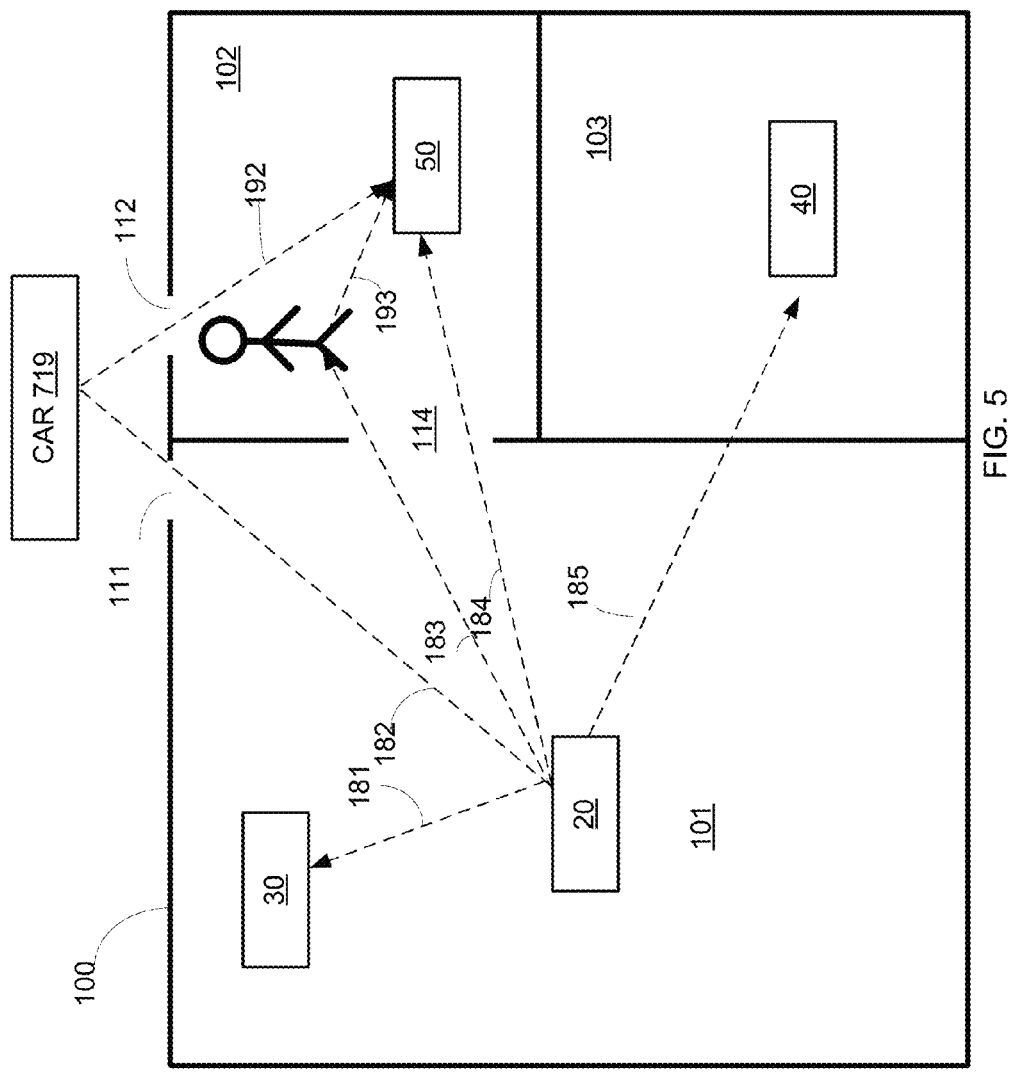
FIG. 5 illustrates DECT devices and their environment according to an embodiment of the invention.
Figure 6:
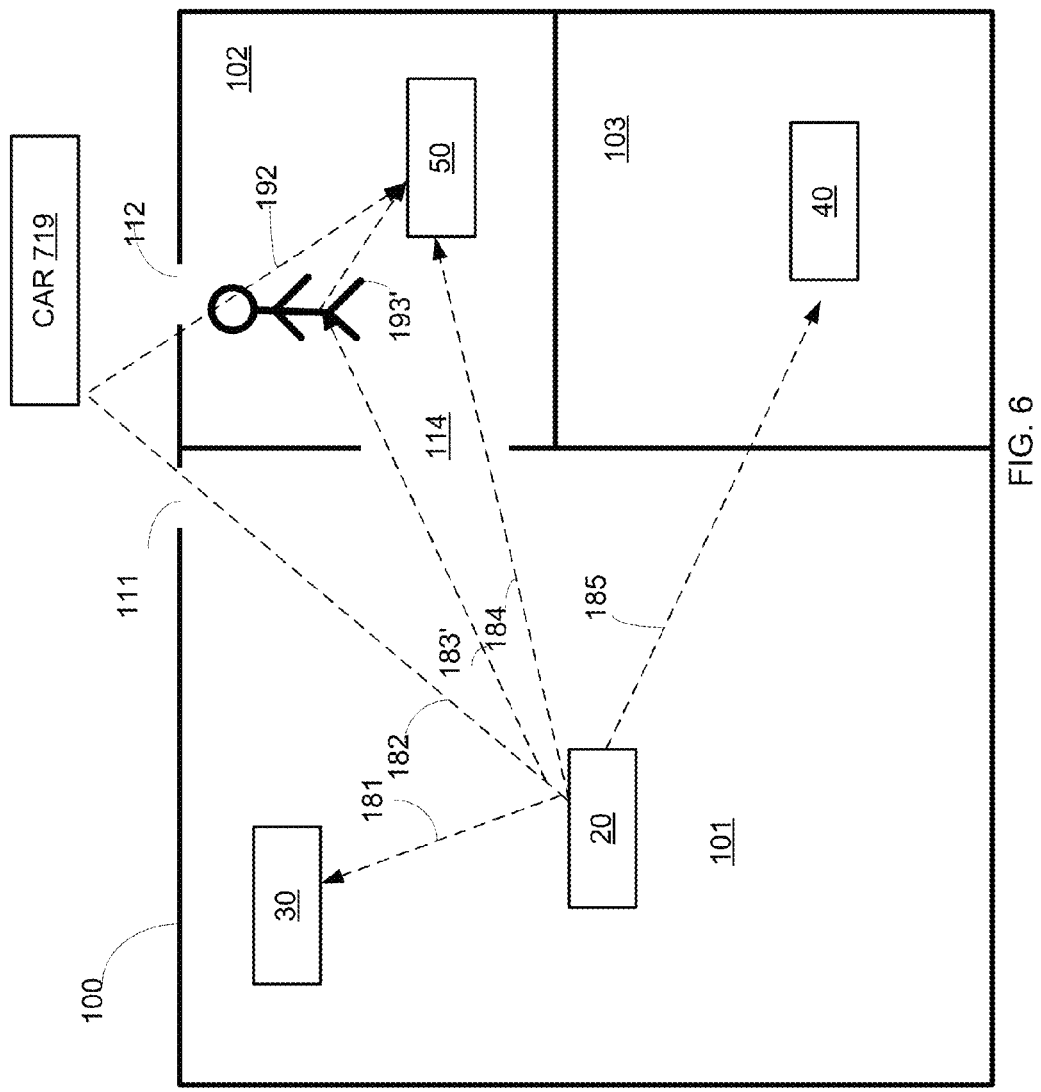
FIG. 6 illustrates DECT devices and their environment according to an embodiment of the invention.
Figure 7:
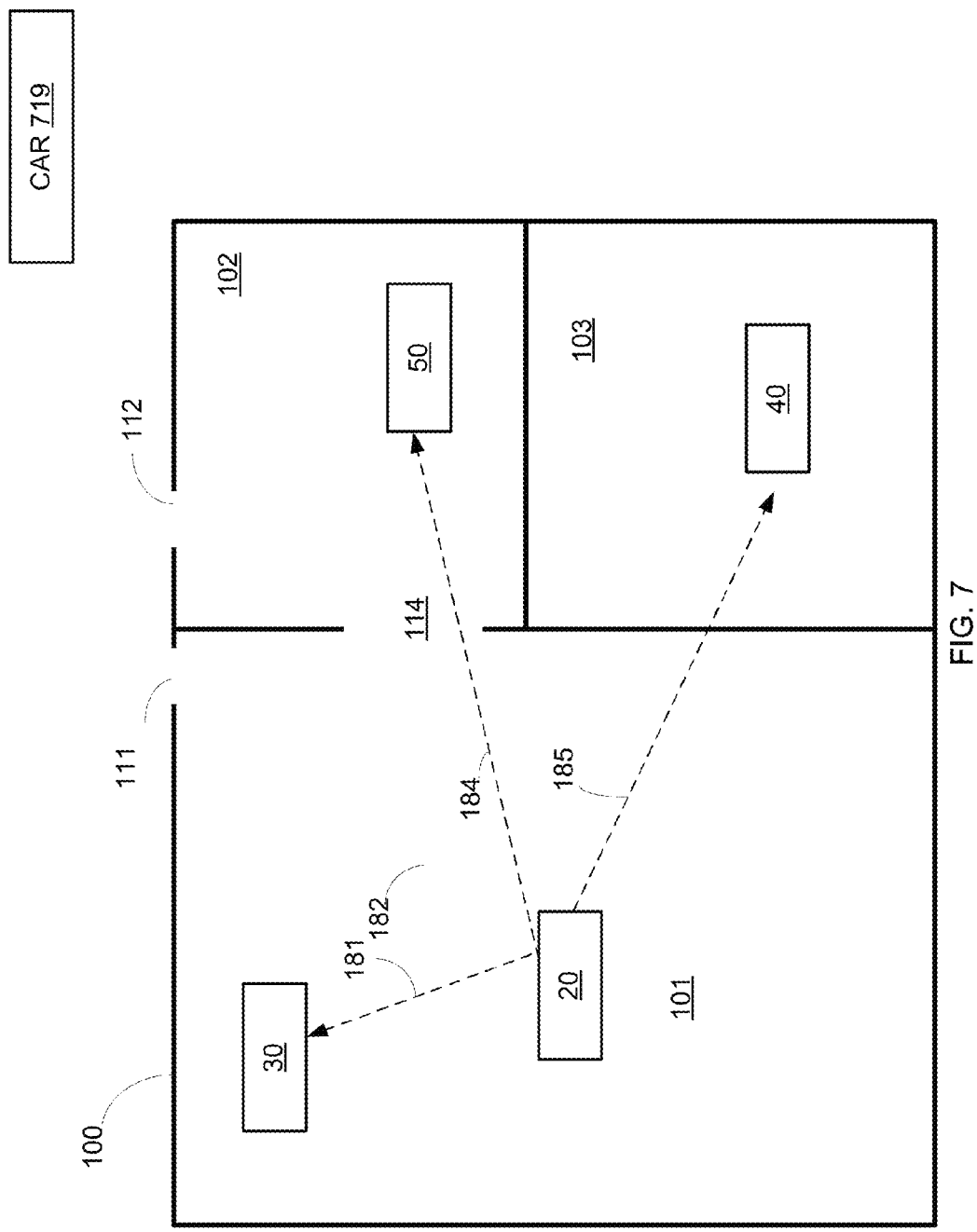
FIG. 7 illustrates DECT devices and their environment according to an embodiment of the invention.

FIGS. 5-7 illustrates DECT devices 20, 30, 40, 50 located within rooms 101, 102 and 103 of an apartment 100.

DECT devices 20 and 30 are located within room 101. DECT device 50 is located within room 102 that has window 112 and door 114. DECT device 40 is located in room 103 that has window 113.

The apartment 100 has windows 111 and 112 that are located at the exterior of the apartment. DECT device 20 transmits DECT transmitted signals (such as but not limited to DECT beacons).

FIGS. 5-7 illustrates how the effect of remote moving objects outside the house becomes negligible because of the big attenuation (>10 dB) of the house walls. A moving car 79 outside the house would not be detected by the receiver processing unit, as the signal component that is received by the receiver due to the reflection from the car is at least 20 dB weaker than reflected signals components that are returned from objects inside the house. Hence, the signal reflected from the car will only have a minor effect on the amplitude of the superposition signal that is received by the receiver.

DECT device 50 receives, due to the transmission of the transmitted DECT signals, received DECT signals 192, 193 and 184. Received DECT signal 184 is directly received from DECT device 20, received DECT signal 192 is received as a result of a reflection of transmitted DECT signal 82 after being dramatically attenuated when passing through window 111, impinging on car 79 and then further attenuated when passing through window 112, and received DECT signal 193 is received as a result of a reflection of transmitted DECT signal 188 from person 71.

In FIG. 6 the person (due to its movement) is located at a different location and DECT device 50 receives DECT signal 193' instead of received DECT signal 193. DECT signal 193' is received as a result of a reflection of transmitted DECT signal 183' from person 71. DECT signal 193 differs from DECT signal 193'.

In FIG. 7 there is no person 71 in the room and DECT device 30 does not receive any signal instead of receiving received DECT signal 193 or received DECT signal 193'. Furthermore—the car moves further away and does not reflect any signal towards DECT device 50—so that DECT device 50 does not receive received DECT signal 92.

DECT device 50 receives a superposition of the different received DECT signals at each point of time and is expected to measure the attributes (for example RSSI) of the received DECT signals. The movement of person 71 is expected to result in detectable differences between the received DECT signals that are received at different points of time.

Any one of the DECT devices 20, 30, 40 and 50 may be a DECT base station or another DECT device. It may be assumed that DECT station 20 is a DECT base station but this is not necessarily so.

The motion detection may involve multiple DECT devices to cooperate. This can be done by using existing hardware of these DECT devices and adjusting the software executed by the processor of these DECT devices that will cause DECT devices such as a DECT base station and a DECT handset to execute the following stages:

a. A DECT handset to measure the RSSI (Received Signal Strength Indicator) level at every DECT beacon sent from the DECT device.

b. The DECT handset should be arranged to process the RSSI samples and look for certain amplitude change patterns in the received RF signal amplitude. The processing may include, for example, collecting a series of RSSI samples at sampling rate of, for example, 100 sampler per second. Performing a time to frequency domain transform such as Fast Fourier Transform (FFT) on the series of RSSI samples and detect bins of energy peaks in the frequency domain. Use the detected peaks to predict range of velocities of possible moving objects in the area between the DECT handset and the DECT base station and send the resulted information to the DECT base station.

c. The DECT handset should report its findings to the base station.

d. The DECT base station should collect motion detection reports from all handsets in the network, process it, and send alert to the house owner (e.g. initiate a PSTN (public switched telephone network) call or send an SMS (short service message) message to the cellular mobile of the house owner). The DECT base station may collect information from all DECT handsets and decide whether or not there is an indication on possible interesting motion (use adaptive energy thresholds and fixed velocity thresholds to do that). If decided that there is an interesting motion, the DECT base station may predict the location (which room . . . ) of the suspicious moving object by inspecting the correlation between the various measurements and the appropriate energies. Vehicles motion or pets motion may be filtered out as the predicted velocity may be out of the interesting velocity range.

The DECT network can also incorporate special units that are intended for motion sensing and do not contain a display and keyboard. Such units can be mounted in fixed locations on the house walls. This configuration has the advantage of a stable consistent system that does not suffer from the uncertainty of where the DECT handsets were left within the house.

As the DECT also incorporates an audio link, the DECT system can automatically establish an audio link to the house owner immediately when motion is detected. This way the house owner can listen and check whether the alarm was a true or a false alarm. In a similar way, the base station can automatically establish a video link between house and house owner.

When the handset or base station has some doubt regarding the motion detection, the handset unit may transmit its own signal to have the base station try to detect motion. Also, when there are multiple handsets, a specific handset can take advantage of the transmission of other handsets to re-measure and try to verify its decision.

By collecting reports from multiple handsets, the base station may try to predict the location of the moving object and report to the house owner.

There may be provided a motion sensor added feature in a regular DECT equipment.

There may be provided a dedicated motion sensing DECT unit based on RF sensing

There may be provided a method that includes at least one out of: (i) A DECT base station may be arranged to receive reports from handset unit(s), process all reports and produce a decision about a motion (ii) a base station sends a PSTN or a SMS alert to house owner; (iii) a Base station establishes an audio link and/or video link to a house owner, (iv) a handset unit may transmit signals for the base station to double check the motion suspicious; (v) a handset unit may transmit signals to other handset units to better check the motion suspicious; (vi) a base station to try to predict the location of moving object.

Figure 8:
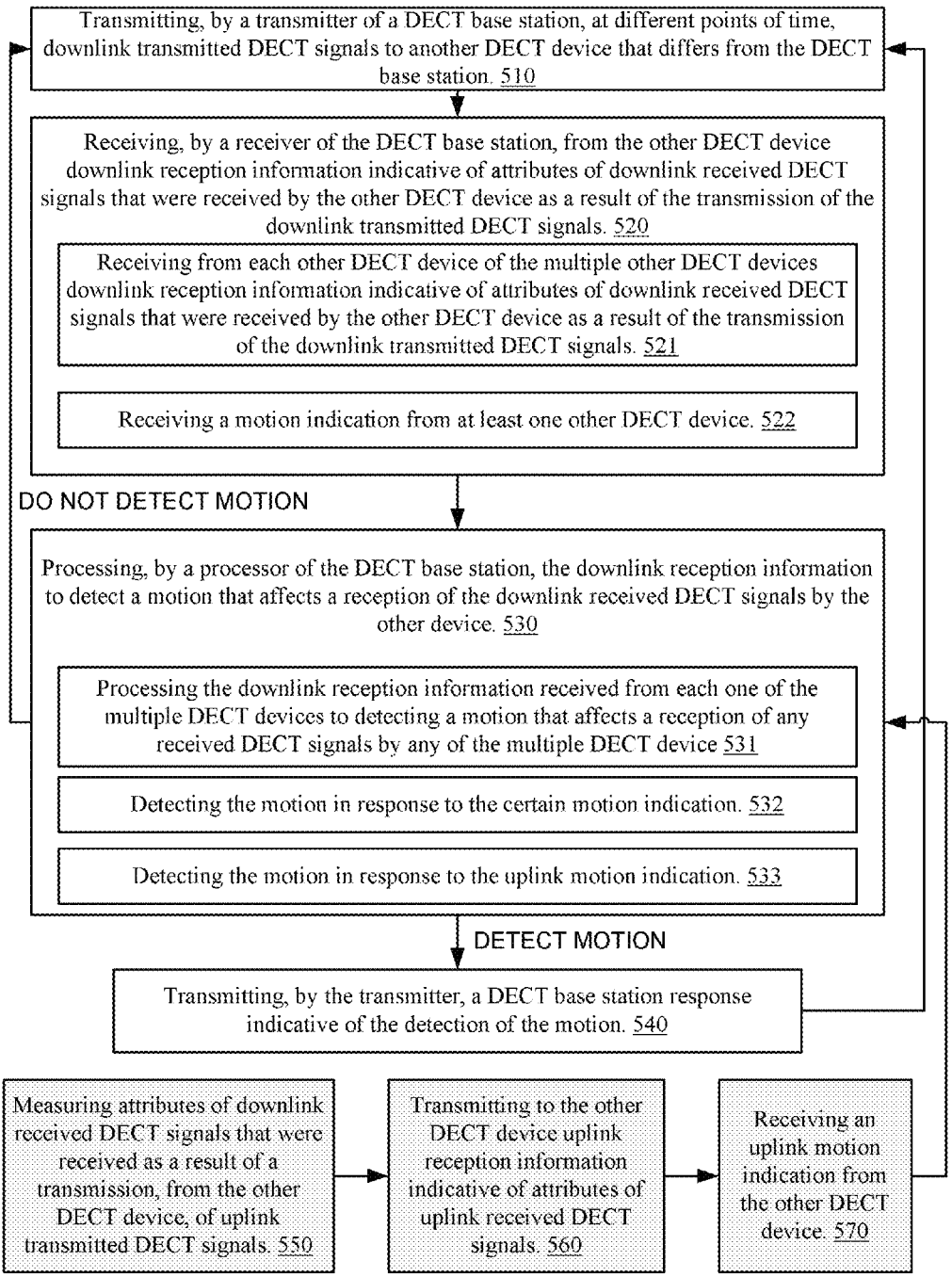
FIG. 8 illustrates a method according to an embodiment of the invention.

FIG. 8 illustrates method 500 for DECT based motion detection, according to an embodiment of the invention.

Method 500 may start by stage 510 of transmitting, by a transmitter of a DECT base station, at different points of time, downlink transmitted DECT signals to another DECT device that differs from the DECT base station.

The other DECT device may be a DECT handset, a stationary DECT device that is without a display and a keyboard, a DECT sensor (other than motion sensor).

Stage 510 may be followed by stage 520 of receiving, by a receiver of the DECT base station, from the other DECT device downlink reception information indicative of attributes of downlink received DECT signals that were received by the other DECT device as a result of the transmission of the downlink transmitted DECT signals.

Stage 510 may include transmitting transmitted DECT signals that are DECT beacons and stage 520 may include receiving downlink received DECT signals that are received DECT beacons.

The downlink reception information may be indicative of received signal strength indication (RSSI) measurement performed by the other DECT device.

Stage 520 may be followed by stage 530 of processing, by a processor of the DECT base station, the downlink reception information to detect a motion that affects a reception of the downlink received DECT signals by the other device.

The attributes of the received DECT beacons may relate to intensities of the received DECT beacons and stage 530 may include detecting the motion by finding that the downlink reception information is indicative of changes of intensities between different received DECT beacons that differ from expected changes of intensities at an absence of motion that affects the reception of the downlink received DECT signals by the other device.

If detecting the motion—stage 530 may be followed by stage 540 of transmitting, by the transmitter, a DECT base station response indicative of the detection of the motion.

Stages 540 may be followed by stage 510.

Stage 540 may include transmitting the DECT base station response utilizing communication channels that differ from a DECT communication channel established between the DECT base station and the other DECT device.

The DECT base station response may be transmitted, directly or indirectly to a user device that differs from the DECT device and the other DECT device. The user devices can be a non-DECT communication device. It can be, for example, a smartphone, a computer and the like. The DECT device response can be sent to a third party such as a police, a protection service vendor and the like.

Else (if not detecting motion)—jumping to stage 510.

According to an embodiment of the invention multiple other DECT devices and not only a single DECT device are involved in the motion detection.

In this case (a) stage 510 may include transmitting (511), at the different points of time, downlink transmitted DECT signals to multiple other DECT devices that differs from the DECT base station; (b) stage 520 may include receiving (521) from each other DECT device of the multiple other DECT devices downlink reception information indicative of attributes of downlink received DECT signals that were received by the other DECT device as a result of the transmission of the downlink transmitted DECT signals; and (c) stage 530 may include processing (531) the downlink reception information received from each one of the multiple DECT devices to detecting a motion that affects a reception of any received DECT signals by any of the multiple DECT devices.

Stage 530 may include detecting a motion (a) only if downlink reception information received from a majority of the multiple other DECT devices are indicative of the motion, (b) only if downlink reception information received from all of the multiple other DECT devices are indicative of the motion, or (c) if downlink reception information received from at least a minority of the multiple other DECT devices are indicative of the motion.

According to an embodiment of the invention stage 520 may also include receiving (522) a certain motion indication from at least one other DECT device and stage 530 may also include detecting (532) the motion in response to the certain motion indication.

Method 500 may also include stage 550 of measuring attributes of downlink received DECT signals that were received as a result of a transmission, from the other DECT device, of uplink transmitted DECT signals.

Stage 550 may be followed by stage 560 of transmitting to the other DECT device uplink reception information indicative of attributes of uplink received DECT signals.

Stage 560 may be followed by stage 570 of receiving an uplink motion indication from the other DECT device. Stage 53 may include detecting (533) the motion in response to the uplink motion indication.

Figure 9:
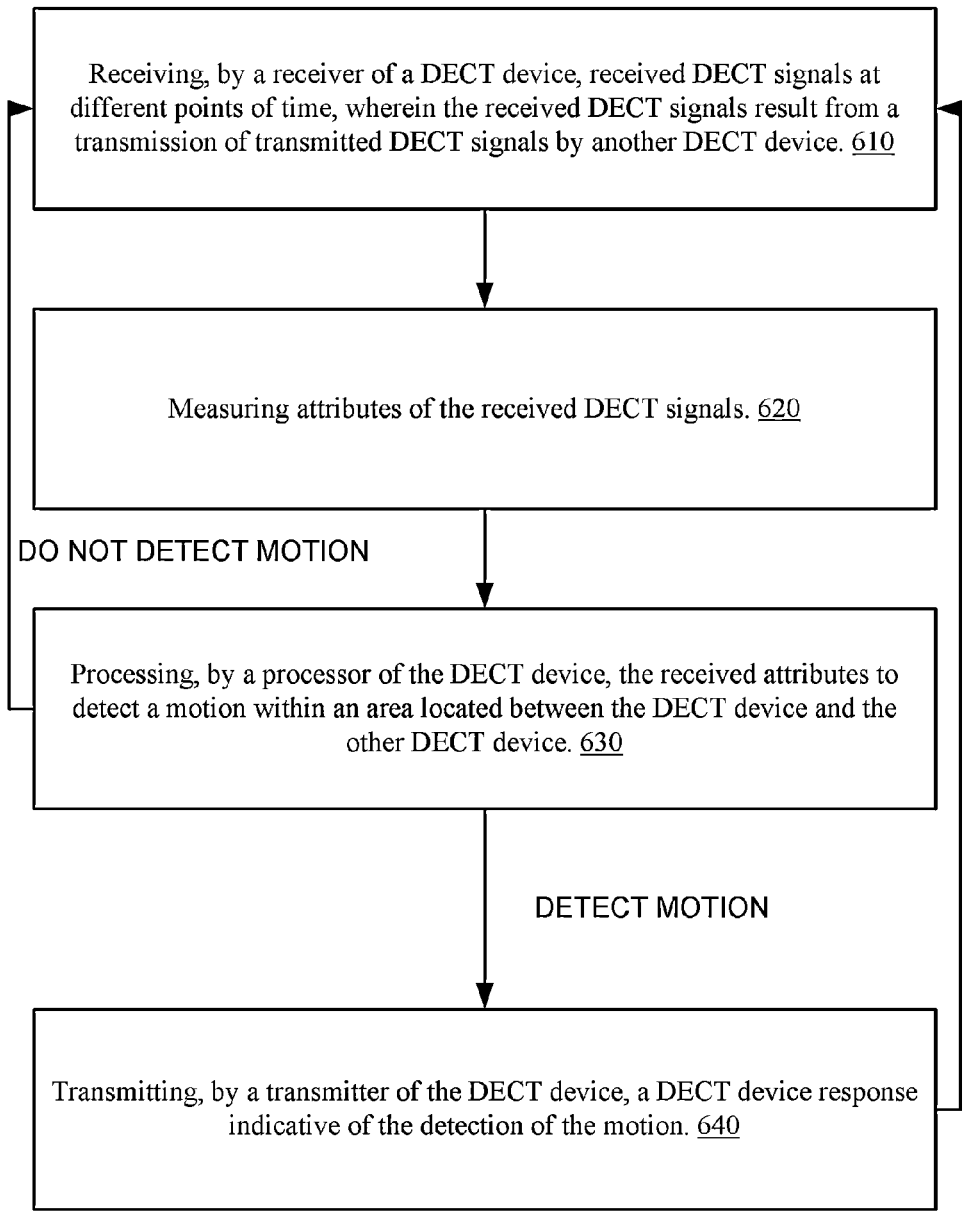
FIG. 9 illustrates a method according to an embodiment of the invention.

FIG. 9 illustrates method 600 for DECT based motion detection, according to an embodiment of the invention.

Method 600 may start by stage 610 of receiving, by a receiver of a DECT device, received DECT signals at different points of time, wherein the received DECT signals result from a transmission of transmitted DECT signals by another DECT device.

The DECT device may be a DECT handset and the other DECT device may be a DECT base station.

The transmitted DECT signals may be transmitted DECT beacons.

Stage 610 may be followed by stage 620 of measuring attributes of the received DECT signals.

Stage 620 may be followed by stage 630 of processing, by a processor of the DECT device, the received attributes to detect a motion within an area located between the DECT device and the other DECT device.

If detecting motion stage 630 may be followed by stage 640. Else—stage 630 may be followed by stage 610. Stage 640 may be followed by stage 610.

Stage 640 may include transmitting, by a transmitter of the DECT device, a DECT device response indicative of the detection of the motion.

Stage 640 may include transmitting the DECT device response while utilizing communication channels that differ from a DECT communication channel established between the DECT device and the other DECT device.

The DECT device response may include a motion indication and information about values of at least some of the attributes.

The DECT device response may be transmitted, directly or indirectly to a user device that differs from the DECT device and the other DECT device. The user devices can be a non-DECT communication device. It can be, for example, a smartphone, a computer and the like. The DECT device response can be sent to a third party such as a police, a protection service vendor and the like.

The intensities of the multiple transmitted DECT beacons may be maintained constant during the multiple points in time, the attributes of the received DECT signals relate to intensities of the received DECT signals and stage 630 may include detecting the motion by finding changes of intensities between different received DECT signals that exceed a threshold.

Method 600 may include stage 650 of transmitting to the other device multiple additional DECT signals during additional point in time to allow the other DECT device to detect motion.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A digital enhanced cordless telecommunication (DECT) base station, the DECT base station comprises:
    a transmitter that is arranged to transmit, at different points of time, downlink transmitted DECT signals to another DECT device that differs from the DECT base station;
    a receiver that is arranged to receive from the other DECT device downlink reception information indicative of attributes of downlink received DECT signals that were received by the other DECT device as a result of the transmission of the downlink transmitted DECT signals; and
    a processor that is arranged to process the downlink reception information to detect a motion that affects a reception of the downlink received DECT signals by the other device, the motion is of an object that differs from the DECT base station and the other DECT device;
    wherein the downlink transmitted DECT signals are DECT beacons;
    wherein the downlink received DECT signals are received DECT beacons;
    wherein the attributes of the received DECT beacons relate to intensities of the received DECT beacons; and
    wherein the processor is arranged to detect the motion by finding that the downlink reception information is indicative of changes of intensities between different received DECT beacons that differ from expected changes of intensities at an absence of motion that affects the reception of the downlink received DECT signals by the other device.

2. The DECT base station according to claim 1 wherein the downlink reception information is indicative of received signal strength indication (RSSI) measurement performed by the other DECT device.

3. The DECT base station according to claim 1 wherein the other DECT device is a DECT handset.

4. The DECT base station according to claim 1 wherein the other DECT device is a stationary DECT device that is without a display and a keyboard.

5. A digital enhanced cordless telecommunication (DECT) base station, the DECT base station comprises:
    a transmitter that is arranged to transmit, at different points of time, downlink transmitted DECT signals to another DECT device that differs from the DECT base station;
    a receiver that is arranged to receive from the other DECT device downlink reception information indicative of attributes of downlink received DECT signals that were received by the other DECT device as a result of the transmission of the downlink transmitted DECT signals; and
    a processor that is arranged to process the downlink reception information to detect a motion that affects a reception of the downlink received DECT signals by the other device, the motion is of an object that differs from the DECT base station and the other DECT device;
    wherein the transmitter is arranged to transmit, at the different points of time, downlink transmitted DECT signals to multiple other DECT devices that differs from the DECT base station;
    wherein the receiver is arranged to receive from each other DECT device of the multiple other DECT devices downlink reception information indicative of attributes of downlink received DECT signals that were received by the other DECT device as a result of the transmission of the downlink transmitted DECT signals; and
    wherein the processor is arranged to process the downlink reception information received from each one of the multiple DECT devices to detect a motion that affects a reception of any received DECT signals by any of the other multiple DECT devices, the motion is of an object that differs from the DECT base station and any of the multiple other DECT devices.

6. The DECT base station according to claim 5 wherein the processor is arranged to detect a motion only if downlink reception information received from a majority of the multiple other DECT devices are indicative of the motion.

7. The DECT base station according to claim 5 wherein the processor is arranged to detect a motion only if downlink reception information received from all of the multiple other DECT devices are indicative of the motion.

8. The DECT base station according to claim 5 wherein the processor is arranged to detect a motion if downlink reception information received from at least a minority of the multiple other DECT devices are indicative of the motion.

9. The DECT base station according to claim 5 wherein the receiver is arranged to receive a motion indication from at least one other DECT device and wherein the processor is arranged to detect the motion in response to the motion indication.

10. A digital enhanced cordless telecommunication (DECT) base station, the DECT base station comprises: a transmitter that is arranged to transmit, at different points of time, downlink transmitted DECT signals to another DECT device that differs from the DECT base station; a receiver that is arranged to receive from the other DECT device downlink reception information indicative of attributes of downlink received DECT signals that were received by the other DECT device as a result of the transmission of the downlink transmitted DECT signals; and a processor that is arranged to process the downlink reception information to detect a motion that affects a reception of the downlink received DECT signals by the other device, the motion is of an object that differs from the DECT base station and the other DECT device; and wherein the receiver is arranged to measure attributes of downlink received DECT signals that were received as a result of a transmission, from the other DECT device, of uplink transmitted DECT signals; wherein the transmitter is arranged to transmit to the other DECT device uplink reception information indicative of attributes of uplink received DECT signals.

11. The DECT base station according to claim 10 wherein the receiver is further configured to receive another motion indication from the other DECT device and wherein the processor is arranged to detect the motion in response to the other motion indication.

12. A method for DECT based motion detection, the method comprises:

transmitting downlink transmitted DECT signals, by a transmitter of a DECT base station and at different points of time, to another DECT device that differs from the DECT base station;

receiving, by a receiver of the DECT base station, from the other DECT device downlink reception information indicative of attributes of downlink received DECT signals that were received by the other DECT device as a result of the transmission of the downlink transmitted DECT signals; and processing, by a processor of the DECT base station, the downlink reception information to detect a motion that affects a reception of the downlink received DECT signals by the other device, the motion is of an object that differs from the DECT base station and the other DECT device;

wherein the downlink transmitted DECT signals are DECT beacons and wherein the downlink received DECT signals are received DECT beacons;

wherein the attributes of the received DECT beacons relate to intensities of the received DECT beacons; and wherein the method comprises detecting the motion by finding that the downlink reception information is indicative of changes of intensities between different received DECT beacons that differ from expected changes of intensities at an absence of motion that affects the reception of the downlink received DECT signals by the other device.

13. The method according to claim 12 wherein the downlink reception information is indicative of received signal strength indication (RSSI) measurement performed by the other DECT device.

14. The method according to claim 12 wherein the other DECT device is a DECT handset.

* * * * *